March 14, 1933.    M. G. GIORDANO    1,901,026
JOINT CONNECTION
Filed Jan. 21, 1932
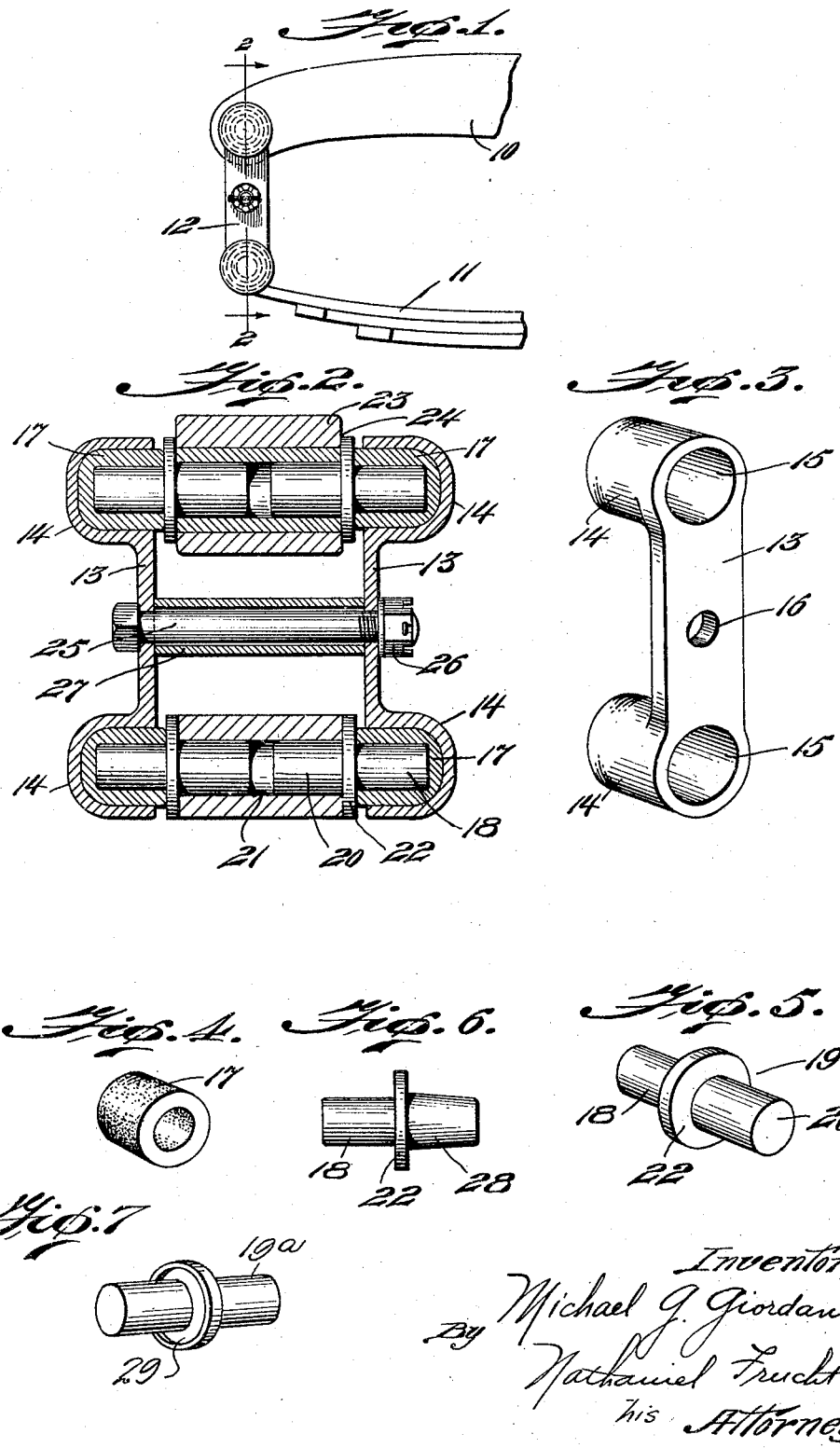

Patented Mar. 14, 1933

1,901,026

UNITED STATES PATENT OFFICE

MICHAEL G. GIORDANO, OF CRANSTON, RHODE ISLAND

JOINT CONNECTION

Application filed January 21, 1932. Serial No. 587,866.

My present invention relates to oscillating joint connections and the parts thereof, and has particular reference to spring shackles for motor driven vehicles.

The spring shackles in general use at the present time require lubrication in order to avoid excessive wear of the metallic contacting parts. The shackles have further disadvantages in that they comprise a multiplicity of parts that are relatively expensive to manufacture, and cannot be quickly repaired and replaced; the shackles are also noisy, and particularly so after the parts have begun to wear.

The principal object of my present invention is to provide a joint connection which does not require lubrication. To this end, bushings of resilient non-metallic material are interposed between the relatively moving parts, and the complete shackle is formed to lock together as a rigid unitary device.

Further objects of the invention are to provide a joint construction which will automatically compensate for wear of the relatively moving parts, and will not be noisy in use, which utilizes a small number of easily manufactured parts that are designed to fit substantially all standard motor vehicle springs, and which is easily mounted and repaired and requires no attention or adjustment after installation.

With the above and other objects and advantageous features in view, my invention consists of a novel arrangement of parts more fully disclosed in the detailed description following, in conjuncton with the appended drawing, and more particularly defined in the claims appended thereto.

In the drawing,

Fig. 1 is a fragmentary detail showing a typical spring shackle mounting;

Fig. 2 is an enlarged section on the line 2—2 of Fig. 1;

Fig. 3 is a perspective view of one shackle link;

Fig. 4 is a perspective view of one non-metallic bushing;

Fig. 5 is a perspective view of one bearing trunnion;

Fig. 6 is a side elevation of a modified form of bearing trunnion; and

Fig. 7 is a perspective view of a bearing trunnion showing the bushing receiving recess.

Referring ot the drawing, and particularly Fig. 1, the rear end of a motor vehicle frame or the like is indicated at 10, and 11 indicates the rear end of the spring being connected together by means of the improved shackle 12.

The shackle 12 includes two similar side links 13, see Fig. 3, having end sections 14 formed with parallel bushing housing recesses 15, and a central bolt receiving opening 16. A cup shaped bushing 17, formed of non-metallic material, and preferably of resilient rubber, is adapted to be inserted in each recess 15 for receiving one end 18 of a bearing trunnion 19.

The bearing trunnion 19 has the other end 20 formed of a suitable size to lock into the bore 21 of the spring end 11, a spacing collar 22 being provided intermediate the trunnion ends to seal the space between the spring end and the cup shaped bushing. The frame end is provided with a suitable bore 23 which preferably contains a tubular bushing 24 to receive the ends 20 of the upper bearing trunnions.

The shackle assembly is completed by a central bolt 25, as indicated in Fig. 2, equipped with the usual lock nut 26; a spacing bushing 27 is positioned on the bolt between the two links 13. The improved shackle therefore includes two side links, four trunnion bushings, four bearing trunnions, a lock bolt, and a spacing bushing for the lock bolt.

The side links are preferably stamped or forged, the trunnion bushings are preferably molded, and the remaining parts are suitable for screw machine manufacture. The parts may of course be made in other ways, if desired; the side links for example could be made of separate parts secured together, for certain installations. The cost of the complete shackle is therefore low.

Moreover, the parts are all interchangeable, and fit substantially all motor driven vehicles, as the use of separate bearing trunnions automatically compensates for different spring and frame section widths. Experience has shown that one size of side link will fit practically all standard automobiles, and with two slightly longer sizes will accommodate the spring shackle needs for substantially all U. S. motor vehicles.

Preferably, the bearing trunnions have a drive fit with the spring and frame parts. The metal parts thus become locked, and the shackle movement is limited to a turning of the outer ends of the bearing trunnions in the rubber bearings. The construction is thus locked against dirt, and is self-adjusting, as the rubber bearings are placed under compression by the locking movement of the central lock bolt, and resiliently press against the bearing trunnion collars. If desired, the outer faces of the trunnion collars may be recessed to receive the ends of the bearing bushings, and thus more effectively exclude dust and dirt, as shown in Fig. 7, the recess 29 of the bearing trunnion 19a being adapted to receive the annular end of the bushing 17.

The outer portions of the link end sections are rounded in order to facilitate cleaning and to prevent catching of clothing and the like on exposed parts. The lock bolt nut is positioned towards the interior of the motor vehicle, for the same reason.

If desired, the inner bearing trunnion ends may be made slightly tapered, as indicated at 28 in Fig. 6, in order to produce a tight wedging into the associated receiving bores of the spring and frame.

The positioning of the center lock bolt as indicated in Fig. 2 rigidly locks the side links and other parts together into a unitary shackle; since the relative movement occurs at the ends, no stress is conveyed to the center lock bolt, there is no tendency for wear and looseness, and no periodic tighting or adjustment of the parts is required.

The above described shackle construction therefore requires no lubrication, is easily assembled from a small number of parts of inexpensive manufacture, is rigid and self-adjusting, is readily replaceable for all present type motor vehicle shackles, and is readily repaired.

While I have described a specific construction of my novel spring shackle, it is obvious that desired changes in the arrangement and the size of the parts may be readily made, within the spirit and the scope of the invention as defined in the appended claims.

I claim:

1. In a joint connection for two members to be connected, said members having bores, side links having bushing housing recesses at the ends thereof, bushings mounted in said recesses, collared bearing trunnions having their inner ends in the bores of the members to be connected and their outer ends movably seated in said bushings, said outer ends being cylindrical, and means for locking said side links to each other to urge the collars of the trunnions upon the bushings.

2. In a joint connection for two members to be connected, said members having bores, side links having bushing housing recesses at the ends thereof, bushings mounted in said recesses, collared bearing trunnions having their inner ends in the bores of the members to be connected and their outer ends movably seated in said bushings, said outer ends extending into the bushings to space the trunnion collars from the side links and said bushings extending to engage the trunnion collars, and means for locking said side links to each other.

3. In a joint connection for two members to be connected, said members having bores, side links having end bushing housing recesses, cup shaped resilient non-metallic bushings in said link housing recesses, trunnions comprising outer cylindrical ends movably seated in said bushings and transverse collars engaging the ends of said bushings, the inner ends of said trunnions extending inwardly to engage the bores of the members to be connected, and a central bolt engaging the center portions of said links.

4. In a joint connection for two members to be connected, said members having bores, side links having end bushing housing recesses, cup shaped resilient non-metallic bushings in said link housing recesses, trunnions comprising outer ends movably seated in said bushings and transverse collars having annular recesses which receive the ends of said bushings, the inner ends of said trunnions extending inwardly to engage the bores of the members to be connected, and a central bolt engaging the center portions of said links.

5. In a joint connection for two members to be connected, said members having bores, side links having end bushing housing recesses, cup shaped resilient non-metallic bushings in said link housing recesses, trunnions comprising outer cylindrical ends movably seated in said bushings and transverse collars having annular recesses which receive the ends of said bushings, the inner ends of said trunnions extending inwardly to engage the bores of the members to be connected, and a central bolt engaging the center portions of said links.

6. In a joint connection for two members to be connected, said members having bores, side links having bushing housing recesses at the ends thereof, bushings mounted in said recesses, bearing trunnions having their inner ends in the bores of the members to be connected and their outer ends movably seated in said bushings, said bushings extending beyond said side links along the outer ends of the trunnions, and means for locking said side links to each other.

7. In a joint connection for two members to be connected, said members having bores, side links having bushing housing recesses at the ends thereof, flexible bushings mounted in said recesses, collared bearing trunnions having their inner ends in the bores of the members to be connected and their outer ends movably seated in said bushings, said bushings extending beyond said side links to engage the trunnion collars, means for locking said side links to each other, and means for spacing the side links away from the trunnion collars.

Signed at Providence, in the county of Providence, and State of Rhode Island, this 31st day of December, A. D. 1931.

MICHAEL G. GIORDANO.